United States Patent [19]

Hanson

[11] Patent Number: 4,827,294

[45] **Date of Patent: * May 2, 1989**

[54] THERMAL INK JET PRINTHEAD ASSEMBLY EMPLOYING BEAM LEAD INTERCONNECT CIRCUIT

[75] Inventor: Gary E. Hanson, Boise, Id.

[73] Assignee: Hewlett-Packard Company, Palo Alto, Calif.

[ * ] Notice: The portion of the term of this patent subsequent to Jan. 6, 2004 has been disclaimed.

[21] Appl. No.: 93,924

[22] Filed: Oct. 26, 1987

Related U.S. Application Data

[60] Division of Ser. No. 937,945, Dec. 4, 1986, abandoned, which is a continuation of Ser. No. 801,034, Nov. 22, 1985, Pat. No. 4,635,073.

[51] Int. Cl.$^4$ .................... G01D 15/16

[52] U.S. Cl. .................... 346/140 R; 346/139 R

[58] Field of Search .................... 346/140, 139

[56] References Cited

U.S. PATENT DOCUMENTS

| | | | |
|---|---|---|---|
| 3,672,034 | 6/1972 | Clark | 29/471.1 |
| 3,700,156 | 10/1972 | Hermanns | 29/470.1 X |
| 4,499,478 | 2/1985 | Matsufuji | 346/140 |
| 4,580,148 | 4/1986 | Domoto | 346/140 |
| 4,610,495 | 9/1986 | Landi | 439/492 X |
| 4,612,554 | 9/1986 | Poleshuk | 346/140 |
| 4,628,150 | 12/1986 | Luc | 361/408 X |
| 4,635,073 | 1/1987 | Hanson | 346/140 X |
| 4,675,693 | 6/1987 | Yano | 346/140 X |

OTHER PUBLICATIONS

Bailx et al.; Sequential Bonding, Western Electric Technical Digest, No. 12, Oct. 1968, p. 1-2.

*Primary Examiner*—Joseph W. Hartary
*Attorney, Agent, or Firm*—William J. Bethurum

[57] ABSTRACT

This application discloses a new and improved thermal ink jet printhead and method of manufacture wherein a tape automated bond (TAB) flexible circuit is sequentially thermosonically bonded in a one-by-one wire bonding process to aligned conductive traces on a thin film resistor substrate. These traces provide electrical current paths for a corresponding plurality of heater resistors on the substrate, and these resistors function to heat a corresponding plurality of ink reservoirs in a thermal ink jet printhead.

3 Claims, 5 Drawing Sheets

THERMAL INK JET PRINTHEAD ASSEMBLY EMPLOYING BEAM LEAD INTERCONNECT CIRCUIT

RELATED APPLICATIONS

This application is a divisional of U.S. application Ser. No. 937,945, filed Dec. 4, 1986, now abandoned, which in turn is a continuation of application Ser. No. 801,034, filed Nov. 22, 1985, now U.S. Pat. No. 4,635,073 issued Jan. 6, 1987.

TECHNICAL FIELD

This invention relates generally to thermal ink jet printing and more particularly to a new and improved low cost, high density thermal ink jet print head assembly and process for manufacturing same. This process features thermosonic beam lead bonding in the plane of the thermal ink jet thin film resistor substrate.

RELATED APPLICATION

Background Art

Thermal ink jet printing has been described in many technical publications, and one such publication relevant to this invention is the *Hewlett Packard Journal*, Volume 36, No. May 5, 1985, incorporated herein by reference.

In the art of thermal ink jet printing, it is known to provide ball and stitch wire bonding to a thermal ink jet thin film resistor substrate in order to complete elecrical signal paths to the individual resistive heater elements on the substrate. Whereas these wire bonding techniques have proven generally satisfactory in many respects, they impose a limiting factor upon the reduction in substrate size used for housing a give number of resistive heater elements. Since the cost of the substrate, especially in the case of monocrystalline silicon, represents a significant percentage of the overall cost of the thermal ink jet print head, then the desirability of even further reducing the substrate size is manifest.

In addition to imposing a limitation on the reduction in substrate size, the ball and stitch wire bonding process of the prior art also imposed a limitation on the achievable packing density of the complete print head assembly.

DISCLOSURE OF INVENTION

Accordingly, it is an object of the present invention to provide a new and improved thermal ink jet print head assembly and process of fabricating same which allows for a reduction in substrate size relative to the above prior art, and thereby provides a corresponding reduction in the overall cost of the thermal ink jet print head assembly being fabricated.

Another object is to provide a new and improved thermal ink jet print head assembly of the type described which is characterized by an increased packing density and improved performance characteristics.

Another object is to provide an assembly of the type described which exhibits the above improvements in substrate size reduction and increased packing density without sacrificing performance or reliabililty.

A feature of this invention is the provision of a print head assembly of the type described which has an extremely low profile print head, thus minimizing the spacing between print head and paper and optimizing the printing speed and printing quality of characters formed on the paper.

These and other objects and novel features of this invention are accomplished by the provision of a new and improved planar bonded thermal ink jet print head substrate and thermosonic beam lead attachment process for fabricating same wherein a thin film resistor print head substrate of predetermined dimensions is mounted on a header member. This header member in turn provides a source of ink supply to the print head. The print head substrate contains a plurality of conductive traces thereon which make electrical connection to resistive heater elements in the substrate. These conductive traces are thermosonically bonded to a plurality of beam leads in an interconnect circuit which extends in the plane of the upper surface of the substrate to thereby maximize packing density of the print head assembly.

The beam leads to the interconnect circuit also extend over a predetermined slanted surface portion of the header member and are resiliently mounted to protrude away from the surface of the header member to thus enable the print head assembly to be firmly, yet removably, connected to mating conductors on a printer housing. Advantageously, the beam leads of the interconnect circuit are resilienty extended toward the printer housing by means of an elongated material having elastomeric properties which is positioned between the beam leads and the surface of the header member over which they extend.

The present invention and above objects and features thereof will better understood by referring to the following description of the accompanying drawings wherein:

BEST MODE FOR CARRYING OUT THE INVENTION

Figure 1A:
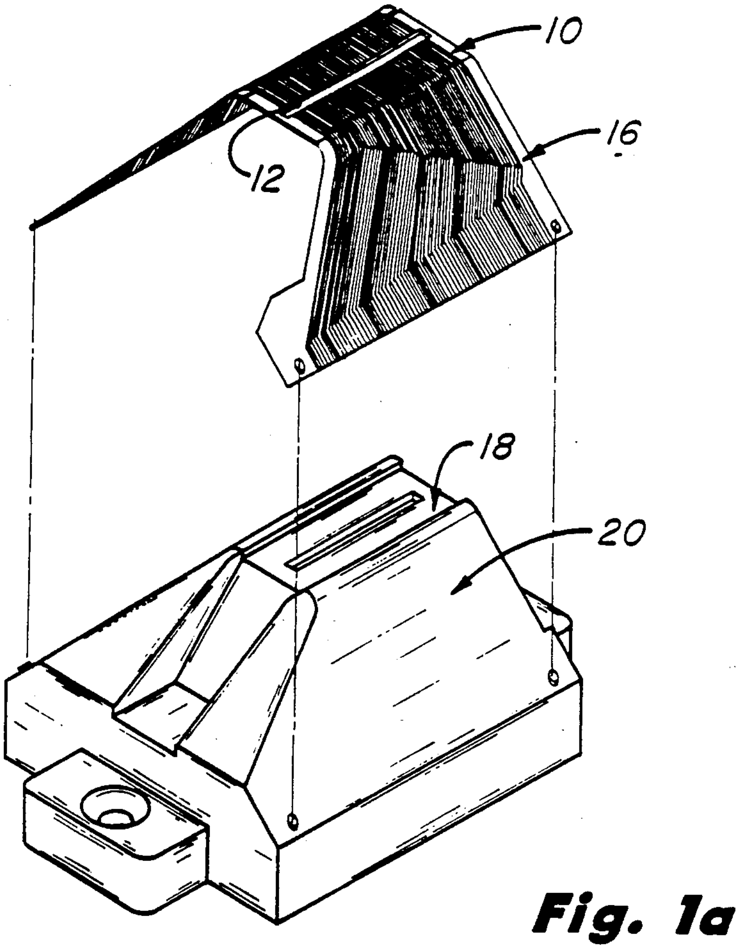
FIG. 1*a* is an exploded view of the header, the semiconductor thin film substrate, and the beam lead flexible circuit portion of the print head assembly according to a preferred embodiment of the present invention.
Figure 1B:
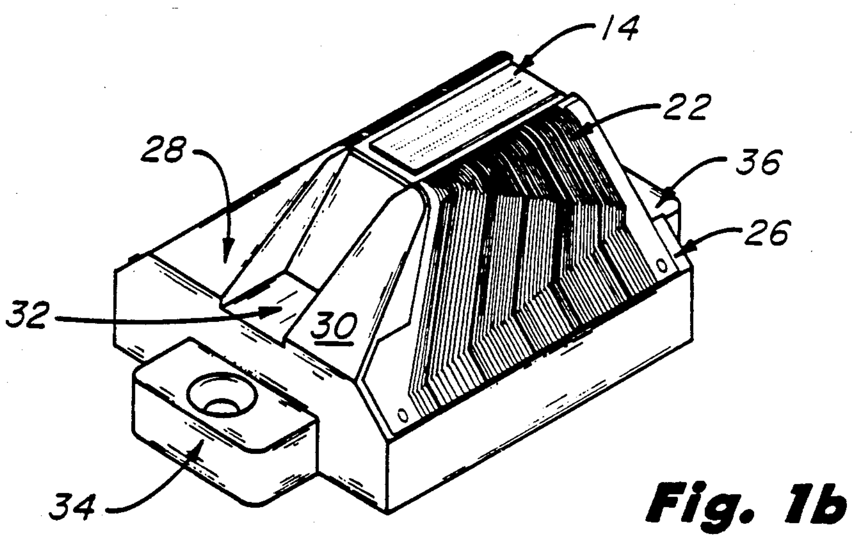
FIG. 1*b* is an isometric view of the completely assembled print head assembly, including the top orifice plate which is bonded atop the thin film substrate and beam lead connections thereto.

Referring now to FIG. 1*a*, there is shown a thin film resistor silicon substrate 10 having an elongated slot 12 therein which serves as an ink intake port for providing ink to a plurality of ink reservoirs (not specifically shown) and to corresponding ink ejection orifices in an orifice plate 14 shown in FIG. 1*b*. The thin film resistor silicon substrate 10 has a plurality of aluminum conductive traces thereon which have been deposited using conventional aluminum evaporation techniques, and these conductive tracings extend to a location near the outer edges of the substrate where they are bonded to corresponding beam leads of a flexible interconnect circuit 16. This flexible interconnect circuit 16 is preferably a tape automated bond (TAB) circuit of the type manufactured and sold by the Minnesota Mining and Manufacturing (3M) Company of Minneapolis, Minn.

Once the TAB bonding step illustrated in the top view of FIG. 1*a* has been completed (as described in greater detail below with reference to FIGS. 2*a* and 2*b*), the top portion of FIG. 1*a* is positioned in place on the top surface 18 of the plastic header 20. This positioning of the semiconductor substrate and associated TAB bond flexible circuit 16 in place on the header 20 is shown in the assembled view of FIG. 1*b* which further includes the placement and bonding of the upper orifice plate 14 in place as shown. Here the multiple beam leads 22 of the TAB bond circuit 16 are folded downwardly at an angle and then outwardly of the semiconductor thin film substrate 10 and are tied down at the lower edge of the slanted outer wall 26 of the header.

The header 20 also uses slanted end walls 26 on both sides for mounting and alignment of the printhead assembly in a carriage of an ink jet printer. Additionally, the print head assembly of FIG. 1*b* includes a pair of end tabs 34 and 36 which facilitate the handling of the print head assembly prior to mounting in a printer carriage.

Figure 2A:
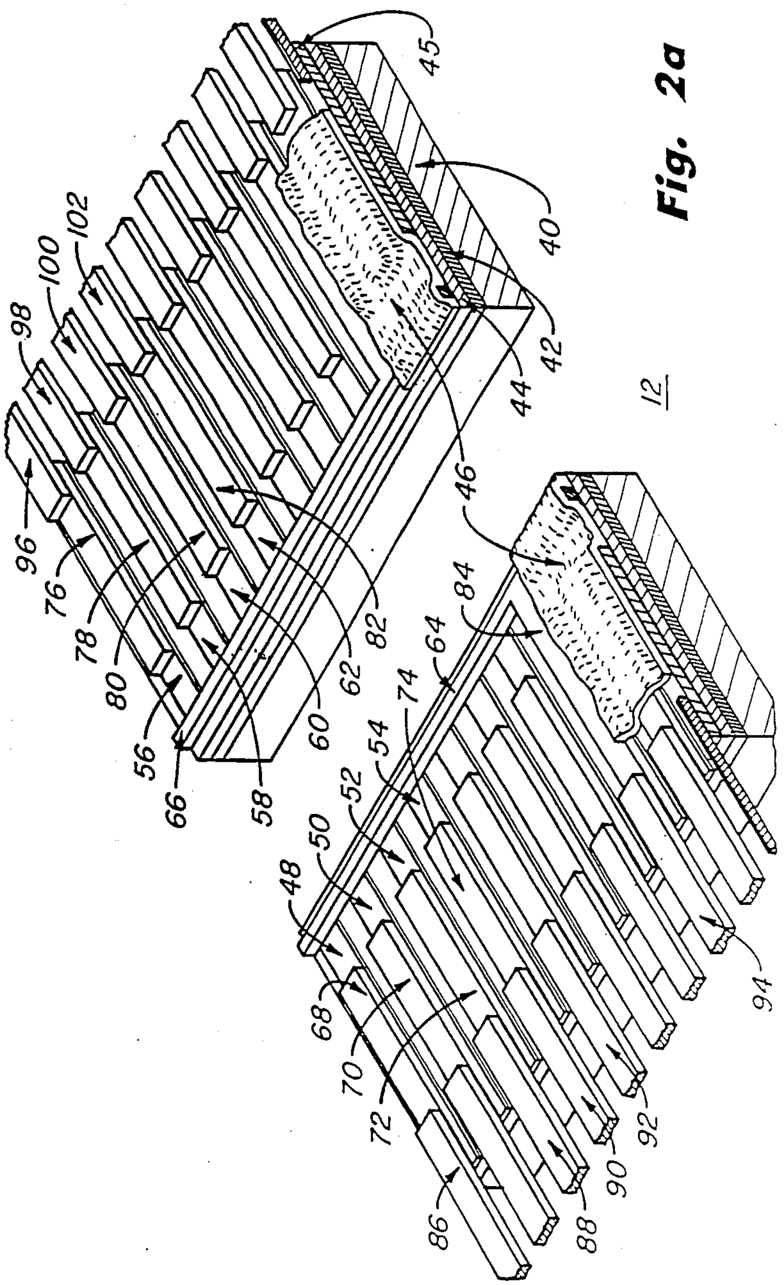
FIG. 2*a* is a partially cut-away isometric view of the thin film resistor substrate and beam lead electrical interconnects therefor.

Referring now to FIG. 2*a* there is shown a silicon substrate 40 having respectively layers of silicon dioxide 42, tantalum aluminum 44, aluminum 45 and silicon carbide 46 deposited thereon using vapor deposition processes known to those skilled in the semiconductor processing arts. The silicon dioxide layer 42 provides a first layer of silicon surface passivation for the substrate 40 whereas the tantalum aluminum layer 44 serves as the thermal resistor material in areas which have been photolithographically defined adjacent the surface conductor terminations to be further described. The silicon carbide layer 46 is a highly inert refractory material and is deposited atop the tantalum aluminum layer 44 to provide a good barrier layer for ink reservoirs (not shown) subsequently formed over the thermal heater resistors within the tantalum aluminum layer 44.

The tantalum aluminum resistors have been photolithographically defined, for example, in the areas 48, 50, 52, 54 on the near side of the ink feed slot 12 and in the areas 56, 58, 60 and 62 on the far side of the ink feed slot 12. At the inside edge of these resistors, or edge nearest the slot 12, there are a pair of ground return or buss bar connections 64 and 66 which extend along the lengthwise edge of the slot 12 and provide a return or ground line for the electronic drive circuitry for these resistors. Electrical drive current pulses are fed to the tantalum aluminum resistors 48, 50, 52, 54, 56, 58, 60 and 62 by means of a plurality of conductive aluminum traces which are indicated at 68, 70, 72 and 74 on the near side of the isometric structure of FIG. 2 and at 76, 78, 80 and 82 on the far side of the structure in FIG. 2*a*. There may also be one or more aluminum traces 84 leading into the bus bar or grid line 64 for providing a ground or return line to the electronic drive circuitry for the thin film resistor structure 10.

Each of the conductive traces such as 68, 70, 72 and 74 are brought into perfect alignment with a corresponding plurality of beam leads 86, 88, 90 and 92 of the previously identified TAB bond flexible circuit, and there may be one or more additional ground leads such as 94 which make connection to the corresponding ground line 84 leading into the bus bar 64. Once these beam lead members 86, 88, 90, 92, and 94 are positioned in place as shown, they are bonded one by one in sequence to the corresponding conductive aluminum traces using a preferred type of bonding tool (see FIG. 4) and a controlled combination of ultrasonic energy, pressure, heat and time so as to provide a good metal-to-metal thermosonic bond between each beam lead member of the TAB flexible circuit and its corresponding conductive trace member leading into the tantalum aluminum heater resistors. These beam lead members on the far side of the structure of FIG. 2*a* are indicated as 96, 98, 100 and 102 respectively.

Figure 2B:
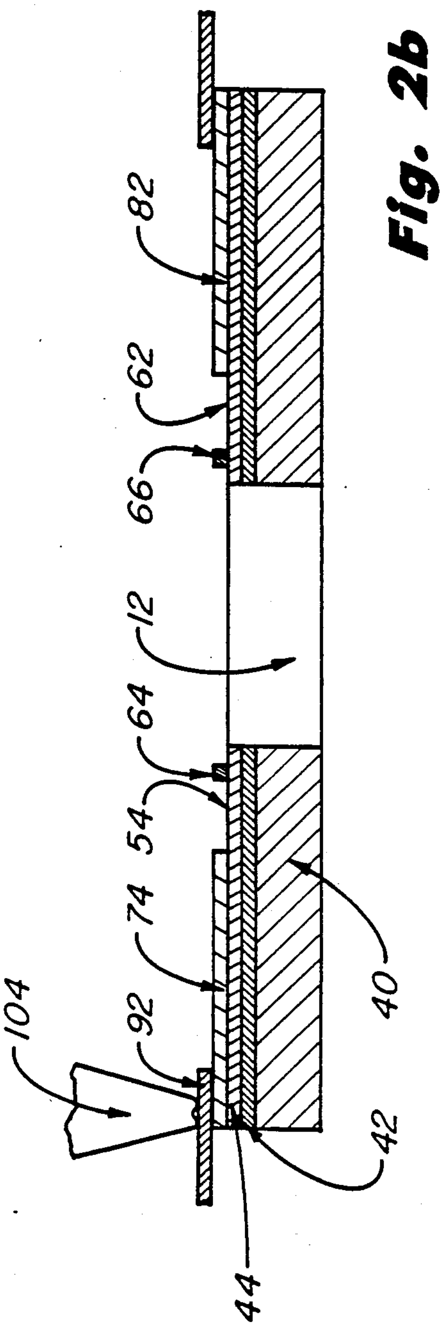
FIG. 2*b* is a cross-section view taken along lines B—B of FIG. 2A.

Referring now to FIG. 2*b*, which is a cross-section view taken along lines B—B of FIG. 2*a*, there are shown the tantalum aluminum resistors 54 and 62 on opposite sides of the slot 12 and laterally defined on one side by the inside edges of the bus bars 64 and 66. The other edges of the tantalum aluminum heater resistors 54 and 62 are defined by the ends of the aluminum traces 74 and 82, respectively, and the beam leads, e.g. 92, are bonded by a precision bonding tool 104 to be described in more detailed below with reference to FIG. 4.

Figure 3A:
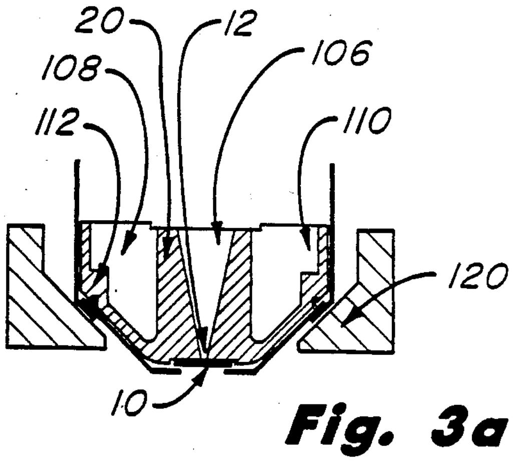
FIG. 3*a* is a schematic cross-section view of the print head assembly according to the invention in its pressure connect position in a printer carraige.
Figure 3B:
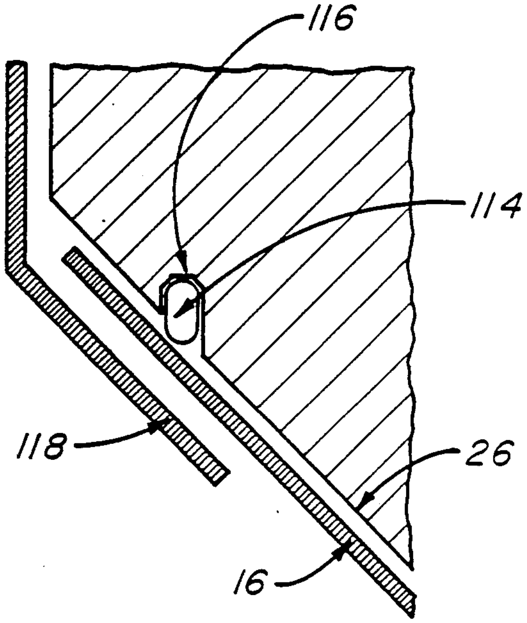
FIG. 3*b* is a greatly enlarged view of the pressure connect portion of the slanted header wall, including the elastomer insert portion thereof.

Referring now to FIG. 3*a*, there is shown a cross-sectional view of the plastic header 20 which includes a central ink storage region 106 for receiving a supply of ink and feeding the ink into the elongated slot 12 of the thin film resistor substrate 10. The configuration of the header 20 is further defined by a pair of hollowed out regions 108 and 110 on each side of the inkwell 106, and these regions 108 and 110 are constructed during the injection molding process used to make the header 20. During this process, an interior cylindrical flange 112 is formed in the geometry indicated in order to receive a circular elastomer 114 in an outer cavity or receptacle 116. This elastomer 114 or other equivalent member having the required elastomeric properties is brought in contact with the TAB bond flex circuit 16 where it extends over the slanted outer wall 26 of the header 20. Here the TAB bond flex circuit 16 makes pressure contact with another flexible circuit 118 which extends vertically along the outer vertical side walls of the header 20. Here it is accessable to driving circuitry (not shown) which provides driving current pulses for the heater resistors previously described.

The use of the elastomer 114 enables the TAB bond flex circuit 16 and the flexible circuit 118 to the driving electronics to be brought into good firm electrical contact when the ink jet print head structure of FIG. 1*b* is inserted into the carriage 120 of the thermal ink jet printer. The carriage 120 includes a slanted interior wall 122 for receiving the circuits 16 and 118 on each side of the thermal ink jet print head. Approximately 25 pounds of pressure are applied to the electrical connection adjacent the elastomer ring 114.

Figure 4A:
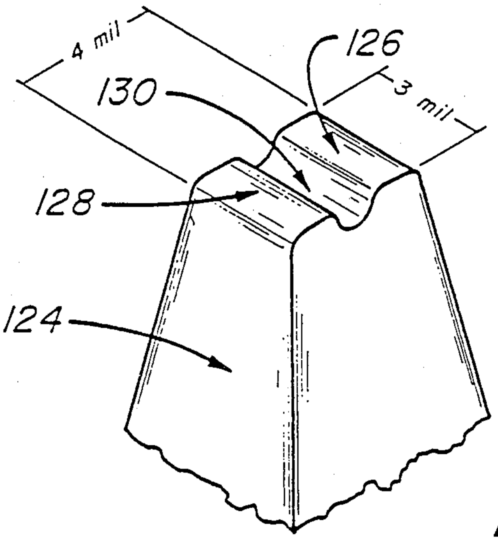
FIGS. 4*a* and 4*b* are an isometric view of the bonding tool and the portion of a beam lead of the flexible circuit which has been bonded to an underlying aluminum conductive trace on the thin film substrate.
Figure 4B:
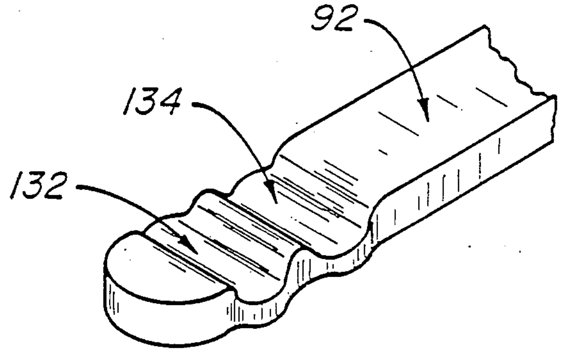

Referring now to FIG. 4, there is shown in an enlarged isometric view the tip 124 of the previously identified bonding tool 104 (FIG. 2*b*). This tip 124 has a bonding surface which includes a pair of flat areas 126 and 128 on each side thereof separated by a trough 130. The dimensions of the total bonding surface areas are, as indicated, 3 mils by 4 mils, and these dimensions clearly illustrate the very small geometries involved when bonding the ends of the beam leads of the TAB bond flex circuit 16 to the corresponding ends of the conductive traces 74 on the surface of the thin film resistor substrate 10.

When the bonding tip 124 is brought into thermosonic contact with the beam lead 92 and then removed after applying predetermined heat, sonic energy and pressure for a predetermined time, the geometrical indentations 132 and 134 are left in the beam leads. The effect of this thermosonic bond is to compress the original thickness of the beam lead 92 of about 1 mil down to between 0.6 and 0.75 mils. This step provides a good strong electrical bond for each beam lead as the bonding tool is sequentially moved in a step-by-step process to sequentially and separately bond all of the beam leads of the TAB bond flex circuit 16 to all of the aligned aluminum conductive traces on the print head substrate. This gold-aluminum bonding system which is capable of producing good strong bonds at bonding temperatures of 70° C. or less avoids the well known and undesirable intermetallic gold-aluminum interaction known as the "purple plague".

Various modifications may be made to the above described embodiments of the invention without departing from the spirit and scope thereof. For example, it is not necessary that the geometry of the semiconductor substrate be configured in a slot ink-feed arrangement, and instead the ink may be fed to the reservoirs above the various heater resistors using a different geometrical feed configuration. Similarly, the conductive traces on top of the tantalum aluminum resistive layer as well as the gold plated copper beam leads may be changed to different, yet bonding compatible, electrical materials within the scope of the present invention.

I claim:

1. An ink jet printhead assembly adapted for insertion into a printhead carriage, said assembly including in combination:

a. a printhead substrate mounted on a header member and operative to receive ink therefrom, b. a plurality of thin conductors disposed atop said substrate and electrically connected to a plurality of transducer elements therein, and c. a beam lead interconnect circuit having a plurality of beam leads bonded, respectively, to said plurality of thin conductors and extending over a chosen outer surface of said header member, and said header member having a surface geometry configured for insertion into a printhead carriage, whereby the portions of said beam leads on said chosen outer surface of said header member may be brought into electrical contact with corresponding mating conductors on said printhead carriage.

2. The assembly defined in claim 1 wherein said beam leads are resiliently extended away from said chosen surface of said header member and thereby enable said assembly to be firmly, yet removably, connected to mating conductors on said printhead carriage.

3. An ink jet pen including in combination:

(a) a pen body housing having an ink storage compartment therein and an ink flow port adjacent one surface thereof and further having outer surfaces which are contoured to mate with adjacent surfaces of a pen carriage member, (b) a thin film printhead mounted on said one surface of said pen body housing and adjacent to said ink flow port therein for receiving ink from said ink flow port during an ink jet printing operation, and (c) a flexible electrical circuit member including a plurality of beam leads bonded at predetermined locations on said thin film printhead for supplying electrical power and signals thereto during an ink jet printing operation, said flexible electrical circuit being extended over one of said contoured outer surfaces of said pen body housing and secured thereto, whereby electrical conductors in a pen carriage are adapted to mate with certain ones of said beam leads of said flexible electrical circuit for supplying power and electrical drive signals to said beam leads when said pen body housing is mounted in said carriage.

* * * * *